(12) United States Patent
Sathe et al.

(10) Patent No.: US 12,405,836 B1
(45) Date of Patent: Sep. 2, 2025

(54) EFFICIENT ALLOCATION OF WORKLOADS BASED ON CORRELATED WORKLOAD CLUSTERS

(71) Applicant: Amazon Technologies, Inc., Seattle, WA (US)

(72) Inventors: Mihir Sathe, Seattle, WA (US); Pranav Rao Perampalli Nekkar, Seattle, WA (US); Aravind Srinivasan, Ellicott City, MD (US)

(73) Assignee: Amazon Technologies, Inc., Seattle, WA (US)

( * ) Notice: Subject to any disclaimer, the term of this patent is extended or adjusted under 35 U.S.C. 154(b) by 602 days.

(21) Appl. No.: 17/208,959

(22) Filed: Mar. 22, 2021

(51) Int. Cl.
  *G06F 9/50* (2006.01)
  *G06F 9/48* (2006.01)
  *H04L 67/1008* (2022.01)

(52) U.S. Cl.
  CPC .......... *G06F 9/5083* (2013.01); *G06F 9/4856* (2013.01); *G06F 9/5011* (2013.01); *H04L 67/1008* (2013.01)

(58) Field of Classification Search
  CPC .... G06F 9/5083; G06F 9/4856; G06F 9/5011; H04L 67/1008
  See application file for complete search history.

(56) References Cited

U.S. PATENT DOCUMENTS

| | | | | |
|---|---|---|---|---|
| 7,398,191 | B1 * | 7/2008 | Gluhovsky | G06F 11/3447 703/22 |
| 8,286,175 | B2 * | 10/2012 | Li | G06F 9/4812 709/224 |
| 9,542,177 | B1 * | 1/2017 | Johansson | H04L 63/0272 |
| 9,684,579 | B1 * | 6/2017 | Adams | G06F 11/261 |
| 2011/0191461 | A1 * | 8/2011 | Dasgupta | G06F 15/173 709/224 |
| 2015/0286704 | A1 * | 10/2015 | Shyr | G06F 16/35 707/737 |
| 2017/0187790 | A1 * | 6/2017 | Leckey | H04L 41/5025 |
| 2019/0026648 | A1 * | 1/2019 | Da | G06F 7/14 |

(Continued)

OTHER PUBLICATIONS

Zhang et al."IO Tetris: Deep storage consolidation for the cloud via fine-grained workload analysis". IEEE 4th International Conference on Cloud Computing (pp. 700-707). (Year: 2011).*

*Primary Examiner* — Aimee Li
*Assistant Examiner* — Willy W Huaracha
(74) *Attorney, Agent, or Firm* — Knobbe, Martens, Olson & Bear, LLP

(57) ABSTRACT

Systems and methods are described for allocating requests to implement new workloads within a set of servers. Each server can have a given proportion of various resources, based on a hardware configuration of the server. Placing multiple workloads that do not match that proportion can result in stranded resources, which are unused but cannot be used due to a lack of other required resources. Embodiments of the present disclosure include load balancer that routes workload requests based on the proportion of resources expected to be used by the workload, by selecting a target server based on whether the target server hosts other workloads that are correlated or anti-correlated with the requested workload. To reduce maintained state information, the load balancer can characterize workloads in terms of clusters, rather than maintaining information as to individual workloads.

20 Claims, 6 Drawing Sheets

(56) References Cited

U.S. PATENT DOCUMENTS

| | | | |
|---|---|---|---|
| 2021/0090556 A1* | 3/2021 | Quemy | G06Q 10/06315 |
| 2022/0008380 A1* | 1/2022 | Jacobson | A61K 31/352 |
| 2022/0019585 A1* | 1/2022 | Beresniewicz | G06F 16/212 |
| 2022/0129316 A1* | 4/2022 | Sheoran | G06F 9/5027 |
| 2022/0283860 A1* | 9/2022 | Gebara | G06Q 40/04 |
| 2022/0294828 A1* | 9/2022 | Keiser, Jr. | H04L 63/0245 |
| 2023/0110467 A1* | 4/2023 | Jha | G08G 1/096791 |
| | | | 701/24 |

* cited by examiner

EFFICIENT ALLOCATION OF WORKLOADS BASED ON CORRELATED WORKLOAD CLUSTERS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

The workloads supported in data centers, such as execution of processes on virtual machine resources, vary in their utilization of computing resources. It is typically desirable to ensure that a given computing device is not allocated more workloads than resources of the device can support. Accordingly, many data centers include load balancers configured to route workloads to an appropriate device. Moreover, it is often desirable to "pack" workloads into a minimal number of devices (often subject to various constraints, such as a maximum load on each device). This packing can provide greater efficiency within a data center, as unused devices can be disabled or reallocated to other tasks. The problem of "packing" workloads into a minimum number of devices (sometimes referred to as the "bin packing problem") is well-recognized within the field of computer science as a computationally complex problem.

DETAILED DESCRIPTION

Figure 1:
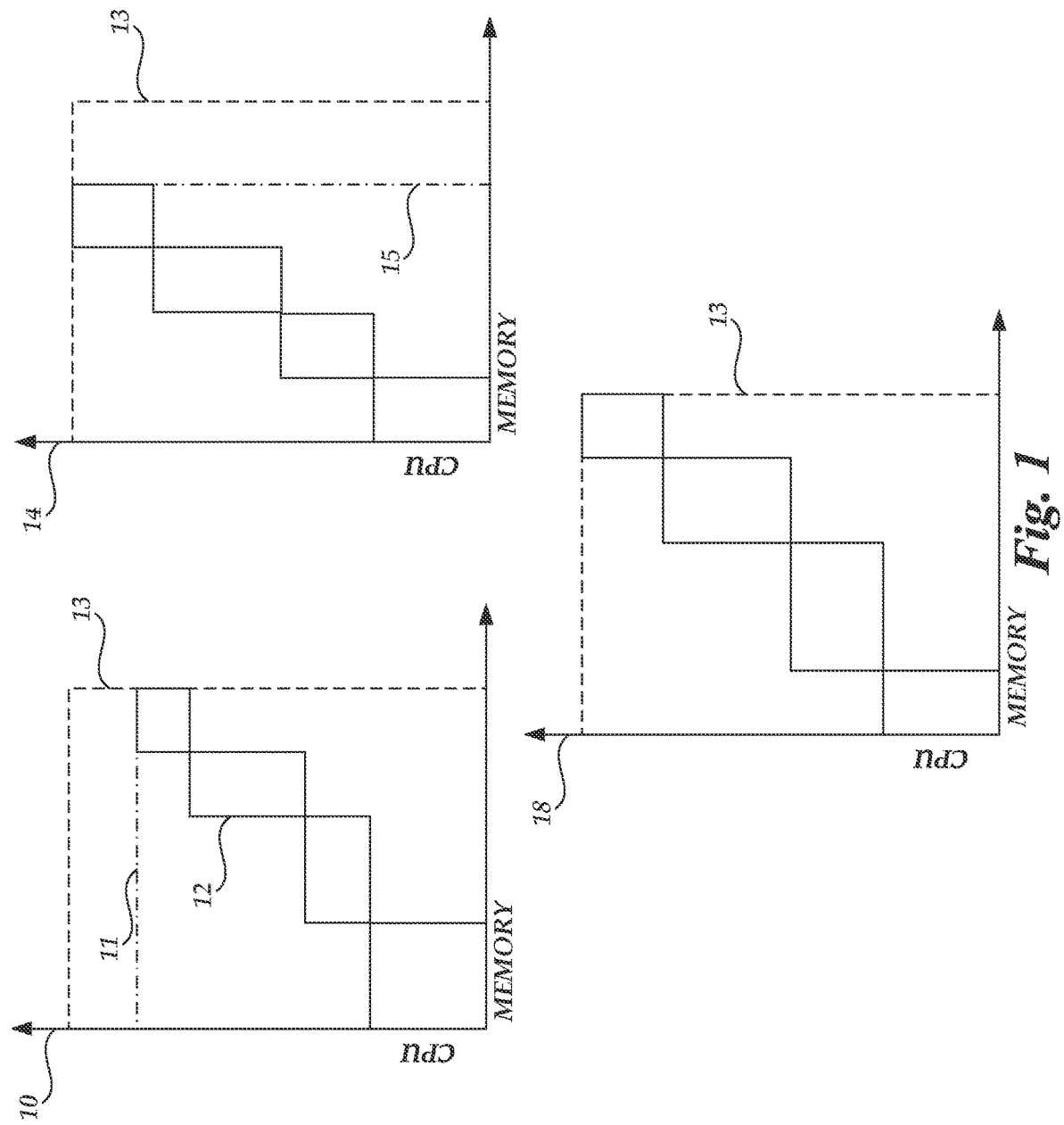
FIG. 1 shows a set of illustrative visualizations of load and resource shapes, demonstrating inefficiencies minimized by embodiments of the present disclosure.

Generally described, aspects of the present disclosure relate to routing workloads among a fleet of servers configured to support such workloads, in a manner that increases the efficiency of the fleet by reducing stranded resources on the fleet. As disclosed herein, a "stranded" resource is a resource that cannot be effectively used within a fleet of servers due to the lack of another resource. For example, servers within a fleet may include both processing (e.g., central processing unit, or CPU) power and memory (e.g. random access memory, or RAM). Typically, workloads require at least some of both resources. If a server within a fleet has consumed all available processor resources, the server cannot generally initiate new workloads even if the server has available memory. This memory can therefore be considered "stranded" and unusable due to a lack of sufficient processor resources. Similarly, a server that has available processor resources but lacks available memory can be said to have stranded processor resources. Embodiments of the present disclosure minimize stranded resources by routing workload requests according to the expected resource usage of the request and current resource availability of potential destination servers. Moreover, embodiments of the present disclosure enable rapid routing of requests by use of clusters to characterize expected resource usage and resource availability, reducing computational complexity of routing decisions and enabling such decisions to be made in a very rapid manner.

Due to the speed and efficiency of such routing decisions, the presently disclosed techniques may be particularly suitable for environments desiring low latency routing decisions, such as on-demand code execution systems. Generally described, an on-demand code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The on-demand code execution system can then enable the user to submit "calls" to execute that script, at which point the system will securely execute the script to provide the desired functionality. Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

To facilitate rapid on-demand code execution, the system can maintain a variety of execution environments (e.g., virtual machine instances, software containers, etc.) pre-provisioned with software, such as an operating system, code libraries and the like, used during execution of code. Each environment may be provided with access to resources of a host computing device hosting the environment. For example, each environment may be associated with a specific amount of random access memory ("RAM") (e.g., n gigabytes), a specific amount of disk storage, a specific amount of central processing unit ("CPU") time (e.g., milliseconds per second of a host CPU), etc. Because each code execution is unlikely to utilize all resources allocated to its environment, the on-demand code execution system can increase efficiency by "over-subscribing" host resources, such that new environments are added to a host until resource usage of the host exceeds a given level (e.g., 90% used). This technique minimizes the number of resources needed to support the on-demand code execution system.

In one embodiment, the resources available at a device and the resources used by a given on-demand code execution can be modeled as a "shape," with each dimension of the shape representing a respective resource. For example, where a device has m megabytes of memory and n CPU milliseconds, the device may be said to have a "shape" corresponding to a rectangle of m width and n height. Similarly, where an execution is expected to use (e.g., at a given point in time or over a range of time) a megabytes of memory and b CPU milliseconds, the execution can be said to have a shape corresponding to a rectangle of a width and b height. The efficiency of resource use of the device can then be measured by overlaying the shape of total load against the shape of total resources, such that area of the shape of resources available that is not covered by the shape of total load represents excess resources available, which resources can be said to be "stranded" on the device as they are typically unusable due to a lack of another resource.

An example visualization of this concept is shown graph 10 in FIG. 1, which compares a hypothetical loads 12 of a given proportion of CPU and memory (e.g., RAM) with resources availabilities on a server 13. Each load 12 is shown in FIG. 1 as a box, with dimensions of that box representing resource usage of the load 12 in terms of CPU and memory (e.g., RAM). Within the graph 10, boxes are stacked such that a first box begins at [0,0] in the graph 10, and each additional load 12 is stacked at the upper-right hand corner of a prior load 12. Thus, the sum of all loads 12 represents total load on a server. As can be seen in FIG. 1, the server has limited resources, shown in graph 10 as box 13. When the total load on the server reaches an edge of the box 13 (which represents, for example, all of a given resource of a server or a maximum percent usable resource of a server, which maximum may be set to ensure some threshold level of available resource remains), the server may be considered fully utilized, such that no additional loads 12 can be placed on the server. However, when only a single edge is reached, resources associated with other dimensions of the box 13 are stranded. For example, in graph 10, the line 11 shows the sum of all loads 12 in terms of CPU usage. Because the line 11 is below the top edge of the box 13, the distance between the line 11 and the top edge of the box 13 represents stranded CPU resources. A similar situation is shown in graph 14, where the loads 12 instead reach the top edge of the box 13 without reaching the right hand side of that box 13. In graph 14, the server can be said to have stranded memory resources, as shown by line 15. In either graphs 10 or 14, it can be readily seen that indiscriminate placement of loads 12 on a server can result in inefficient use of resources on the server.

A more efficient packing of load is shown in graph 18. In that graph, loads 12 are placed such that the total load on a server simultaneously maximizes use of both CPU and memory. This configuration leads to no stranded resources, thus ensuring the most efficiency use of those resources. While it may often be impossible to achieve the utilization of graph 18 in practice, it is typically desirable to come as close as possible to that utilization. However, there is often a trade-off made between efficient packing of loads 12 on a server and the computational complexity of identifying an appropriate server on which to place a load. For example, one approach may attempt to predict resource usage of a workload, and then analyze all available servers to determine a best placement of the workload according to available resources of the server (e.g., by maintaining proportionality of remaining resources available after placing the load). In practice, this approach becomes infeasible when attempting to quickly (e.g., on the order of a few milliseconds or less) route workloads, particularly when the number of servers is large (e.g., on the order of thousands or more).

Embodiments of the present disclosure address this problem by utilizing clustering to characterize the expected resource usage of an incoming workload, as well as the existing workloads on servers. This approach substantially reduces the information required to be maintained at individual servers, as well as the comparisons needed to select a server for potential placement. More specifically, a load balancer on a computing system may, in accordance with aspects of the present disclosure, obtain historical data regarding workloads on the computing system, and applying a clustering algorithm to the historical data to identify clusters of workloads that are similar in terms of resource utilization. Rather than maintaining information as to the expected resource usage of each load placed on a server, each server may instead maintain information as to a number of loads on the server within each cluster. Because the number of clusters can be substantially smaller than the number of loads on a server, often by one or more orders of magnitude, characterizing loads in terms of clusters can substantially reduce the amount of information maintained on each server.

Note that in many or most cases, that the present load on a server is not equivalent or analogous to the sum of expected loads on the server, as resource utilization of each workload generally varies over time. Accordingly, placement of a workload based solely on present load may result in overloading the server during execution of the workload or another existing workload. This may result in failure of a workload or need to relocate the workload, both of which are generally undesirable. Accordingly, it is generally beneficial to maintain information as to the expected resource use of current workloads, rather than rely solely on present resource use. In accordance with embodiments of the present disclosure, characterizing this expected resource use in terms of clustering significantly reduces the resources used in maintaining that information.

Figure 2:
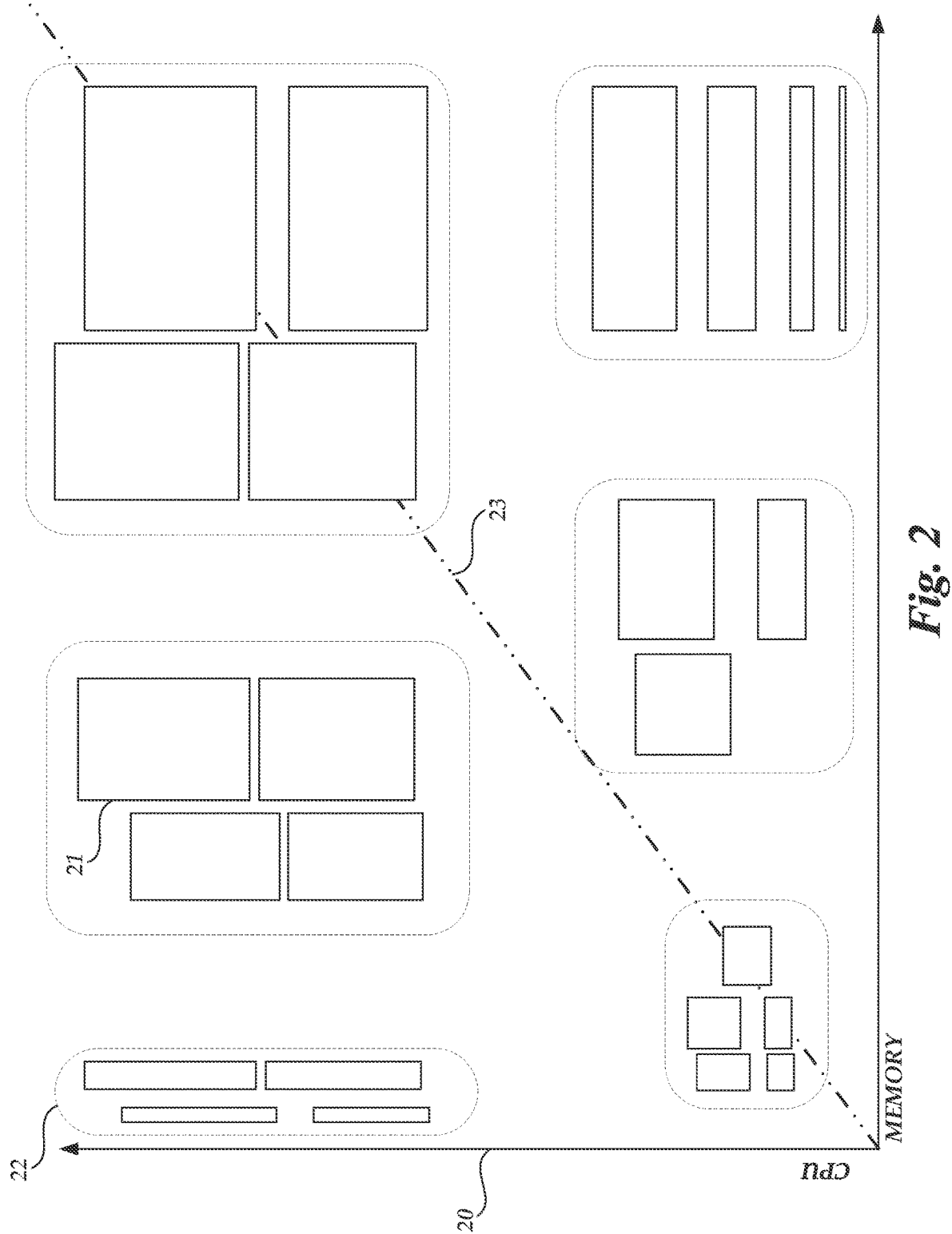
FIG. 2 shows an illustrative visualization of workload clustering in accordance with embodiments of the present disclosure.

An example of such clustering is shown in FIG. 2. Specifically, FIG. 2 depicts a graph 20 that charts the historical CPU and memory (e.g., RAM) usage of workloads on a cloud computing environment. Each box 21 represents a single workload, and is sized to show the relative amounts of CPU and memory used during execution of the workload. These relative amounts may represent, for example, historical averages or other statistical measures (e.g., median usage, usage that 90% of cases fall under, etc.). In the graph 20, the centroid of each box is placed at a location representing the relative amounts of the two resources, and the dimensions of the box are scaled according to those amounts, such that greater usage results in a greater dimensional size. Thus, as can be seen in FIG. 2, workloads with higher historical memory usage occur on the right size of the graph 20 relative to those on the left size, and workloads with higher CPU usage occur higher in the graph 20 relative to those shown lower. One skilled in the art will appreciate that the number of workloads shown in the graph 20 is greatly simplified. In practice, a cloud computing environment may support hundreds, thousands, millions, or more workloads. Moreover, while the graph 20 of FIG. 2 is two dimensional, representing two types of resources, in some cases clustering may occur with respect to n-dimensional resource usage, with each dimension representing one or more resources (e.g., each dimension mapping to a single resource or calculated based on a combination of resource usages). Examples of such resources include, but are not limited to, various types of processor utilization (e.g., CPU use, graphical processor unit (GPU) use, tensor processor unit (TPU) use, etc.), various types of memory use (e.g., RAM, persistent memory such as disk drives or solid state drives, etc.), and bandwidth (e.g., of a network or other communication bus). In some embodiments, each dimension may reflect a total predicted resource use (e.g., as an average of historical usage). In other embodiments, one or more dimensions may be used to reflect use of a resource over time. For example, one or more dimensions may be used to represent a predicted distribution of use of a resource over a period of time at which a workload is expected to execute.

In FIG. 2, the workloads 21 are clustered into various clusters 22, each of which represents a collection of workloads that are similar in location within the graph 20 and thus similar in their historical resource usage. As discussed in more detail below, the workloads 21 can thus be characterized in terms of their cluster 22. Clustering may occur, for example, based on passing each workload (as located in n-dimensional space according to historical resource usage) through a clustering algorithm. A variety of clustering algorithms are known in the art, and thus the details of such an algorithm are not described in detail herein. In one embodiment, the clustering algorithm is the k-means clustering algorithm. Some such algorithms, including k-means, may require specification of the number of clusters to be identified. This number may be determined empirically, such as by manual trial and error to determine whether appropriate clustering has occurred. Additionally or alternatively, this number may be set according to the desired level of granularity in characterizing workloads. For example, a higher number of clusters may result in a higher specificity when characterizing workloads, but require additional computing resources to maintain information characterizing such workloads. Conversely, a lower number may result in lowered required computing resources, but lower specificity. In one embodiment, the number of clusters is in the hundreds, such as around 200 or 250 clusters (e.g., 256 clusters).

As noted above, use of clusters to characterize workloads may significantly reduce the amount of information required to store information about workloads. For example, rather than maintain information as to what specific workloads are currently hosted on a server, a system may instead store information as to how many workloads of each cluster are stored on the server. For example, while FIG. 2 shows 24 workloads and 6 clusters, thus reducing the state information required by a factor of 4. In practice, the number of distinct workloads may be in the millions and the number of clusters may be in the numbers, and thus this reduction may be much higher. As a result, decisions based on workload status, such as routing decisions in order to determine efficient placement of a workload on a server, can occur much more quickly. This results in significantly reducing latency of routing decisions, enabling efficient placement even in systems that require very low latency.

In some cases, it may be desirable to further reduce the amount of information required to conduct routing operations. Accordingly, some embodiments of the present disclosure may be configured to make routing decisions on the basis of outlier clusters, avoiding a need to maintain information as to all clusters. For example, as shown in FIG. 1, a goal of placement may be to place workloads onto servers such that the total shape of the resource usage of the workloads (e.g., as an n-dimensional figure, each dimension representing one or more resources) is geometrically similar to the shape of resources provided by a server, in order to minimize stranded resources. Where a workload's expected resource usage (as determined, e.g., based on historical usage) is geometrically similar to the resources provided by a server, placement decisions can be simplified, since placement of such a workload (or many such workloads) is unlikely to strand resources. Conversely, where a workload's expected resource usage differs significantly from the resources provided by a server, placement might result in stranded resources. Thus, embodiments of the present disclosure may operate to conduct additional placement analysis for these workloads.

In FIG. 2, the difference between shape of resources provided by a server and expected resource usage of a workload is shown by a workloads location relative to line 23. Specifically, line 23 represents a ratio of resources provided by a server configuration (e.g., a proportion of CPU to RAM provided by the physical configuration of a server). For the purposes of the present disclosure, it is assumed that routing occurs on a relatively homogenous fleet, such that different servers to which a request might be routed have the same or substantially similar configuration. Accordingly, if the centroid of a workload falls on the line 23, the shape of resources used by the workload is geometrically similar to the shape of resources provided by the server, and placement of such workloads on a server is unlikely to result in stranded resources. Conversely, if the centroid of a workload does not fall on the line 23, the shape of resources used by the workload is geometrically dissimilar to the shape of resources provided by the server, and placement of such workloads may result in stranded resources. For example, placement of multiple workloads that fall to the top-left of the line 23 may result in stranded memory (as these workloads are expected to use disproportionally high CPU resources), while placement of multiple workloads that fall to the bottom-right of the line 23 may result in stranded CPU (as these workloads are expected to use disproportionally high memory resources).

Accordingly, it may be desirable to make routing decisions based at least partly on the distance of a workload from the line 23. For example, in accordance with embodiments of the present disclosure, a load balancer may identify whether the workload associated with an incoming request falls within a cluster that is at least a threshold distance from the line 23, which may be referred to herein as "outlier" workloads, and modify routing logic for such requests. Illustratively, as described in more detail below, a load balancer may operate such that these outlier workloads are placed to avoid correlation between outlier workloads on a single server, such as by placing an outlier workload on a server with a least number of other workloads of the same cluster. This approach is illustratively referred to as "de-correlation", as it may reduce correlation between similar workloads on a server. In some embodiments, a load balancer can further be configured to seek "anti-correlation" in workloads placed on a server, such as by placing workloads together that fall on opposite sides of the line 23. For example, a combination of a workload on the top-left of the line 23 and a workload on the bottom-right of the line 23 may, in aggregate, result in load on a server that is geometrically similar to the resources provided by the server. Accordingly, a load balancer may operate to preferentially place such workloads together.

While the above describes line 23 in terms of physical resources of a server, some embodiments may define a preferred ratio of resource usage in other terms. For example, in some cases line 23 may be defined according to an average resource usage ratio of all workloads supported by a computing environment. Moreover, while FIG. 2 depicts clusters of workloads in two dimensions, workloads may be clustered and outliers defined according to any number of dimensions.

Figure 3:
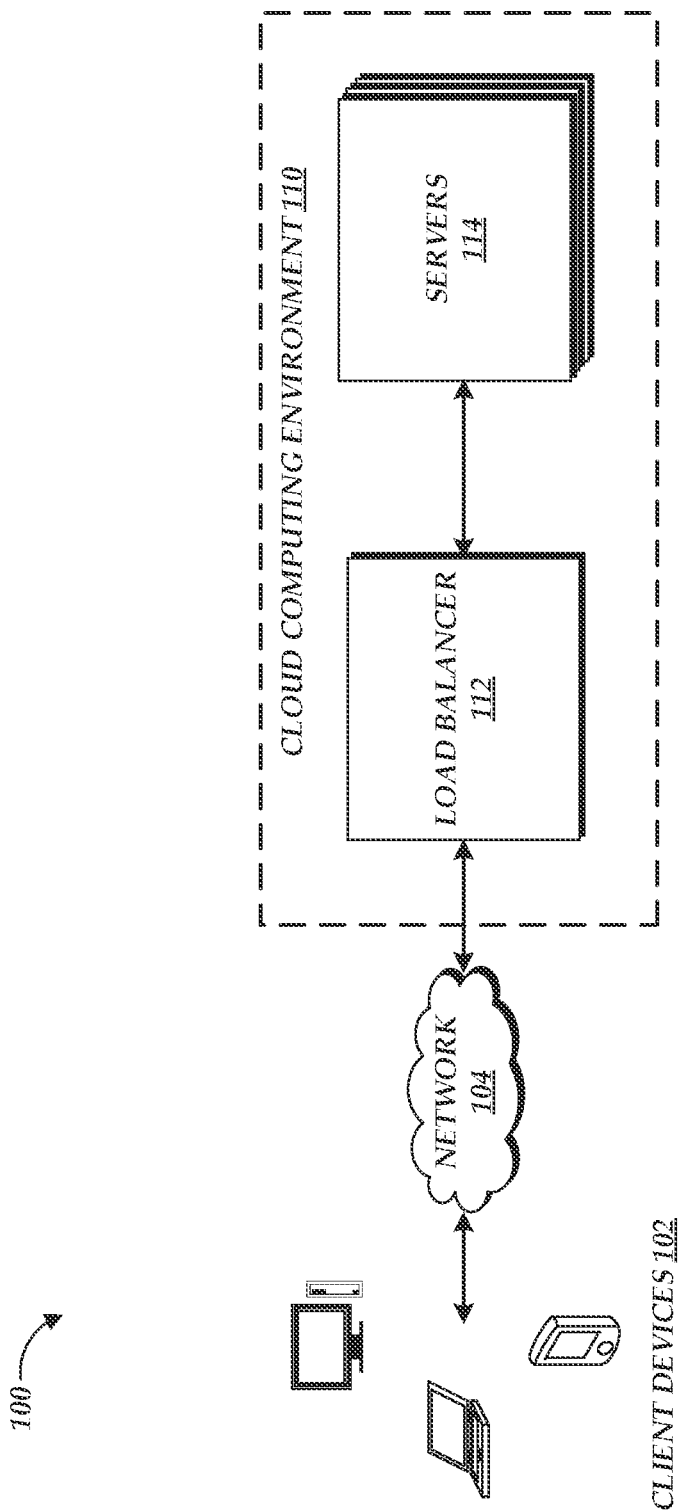
FIG. 3 is block diagram depicting an illustrative environment in which a cloud computing environment can operate to distribute workloads among servers of according to expected resource usage of the workload, and according to correlations or anti-correlations of the workloads and other workloads on potential servers.

FIG. 3 is a block diagram of an illustrative operating environment 100 in which a cloud computing environment 110 may operate to provide a network-accessible service to client devices 102, and to route requests to initiate workloads on the service in accordance with embodiments of the present disclosure. By way of illustration, various example client computing devices 102 are shown in communication with the cloud computing environment 110, including a desktop computer, laptop, and a mobile phone. While shown in FIG. 3 as end user devices, client computing devices 102 can be any computing device, including end user computing devices such as a desktops, laptops or tablet computers, personal computers, wearable computers, personal digital assistants (PDAs), hybrid PDAs/mobile phones, mobile phones, electronic book readers, set-top boxes, voice command devices, cameras, digital media players, and the like, as well as non-user devices, such as servers that themselves provide network-accessible services to end user devices.

A cloud computing environment (sometimes referred to simply as a "cloud"), such as the environment 110 of FIG. 3, refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud computing environment 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud computing environment 110 can provide a variety of services to client devices 102, such as compute services (e.g., services enabling creation of on-demand processing power) and a block storage services (e.g., services enabling creation of on-demand block storage devices). Some implementations of the cloud computing environment 110 can additionally include domain name services ("DNS") services, object storage services, relational database services, and other service configurations for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via client devices 102, to access and configure resources provided by the various services.

The cloud computing environment 110 can provide on-demand, scalable computing platforms to users through the network 104, for example allowing users to have at their disposal scalable "virtual computing devices" via their use of a compute service and block storage service. These virtual computing devices have attributes of a personal computing device including hardware (various types of processors, local memory, random access memory ("RAM"), and hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud computing environment 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers)

and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing environment 110 may deliver content from points of presence outside of, but networked with, these regions by way of edge locations and regional edge cache servers. This compartmentalization and geographic distribution of computing hardware enables the cloud computing environment 110 to provide low-latency resource access to customers on a global scale with a high degree of fault tolerance and stability.

As illustrated in FIG. 3, the cloud provider network 110 can communicate over network 104 with client devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

In FIG. 3, the environment 110 includes a set of servers 114 configured to provide a network-accessible service. The techniques described herein are widely applicable to a variety of services, and as such, the particular service provided by servers 114 is not described in detail herein. However, each server 114 illustratively corresponds to a computing device-virtual or physical-configured with executable instructions to provide the service to client devices 102. The servers 114 may illustratively be created by interaction between a user and the cloud computing environment 110, such as to provision compute resources of the environment 110 to provide the servers 114.

In addition, the environment 110 includes a load balancer 112 configured to distribute requests for the service from client devices 102 to individual servers 114. The load balancer 112 may be a dedicated load balancing computing device or a general purpose computing device configured to provide load balancing functionality. The load balancer 112 may be a physical device, or a virtual device implemented on physical hardware of the environment 110. In FIG. 3, the load balancer 112 is shown as interposed between the client devices 102 and servers 114, representing that request from client devices 102 are first passed to the load balancer 112 before being passed to the servers 114. In some instances, this arrangement may be physical: the servers 114 may be physically linked to the load balancer 112, such the servers 114 are accessible from the network 104 only through the load balancer 112. In other instances, this arrangement may be logical, such that requests for the service are routed by the environment 110 the load balancer 112, which subsequently forwards or redirects the requests to the servers 114. For example, in the case of a serverless computing system, a frontend may obtain a request to initiate a workload, and may interact with the load balancer 112 to request a server 114 onto which to place the workload. The load balancer 112 may route the request to an appropriate server 114, or may select the server 114 and return identifying information of the server 114 to the frontend, which may in turn route the request to the server 114.

The load balancer 112 can illustratively maintain information regarding the set of servers 114, to enable distribution of requests to the servers 114. For example, the load balancer 112 may maintain a record of individual servers within the servers 114, such that new servers may be added, or old servers removed, from the set of servers 114 (e.g., via operation of the cloud computing environment 110 to rapidly create or destroy servers 114). The load balancer 112 may further maintain load or health information for individual servers. Such information may include, for example, a number of requests serviced by a server 114 in a given time frame, computational resource usage or availability of an individual server 114, response time metrics of a server 114, error counts for an individual server 114, etc. In accordance with embodiments of the present disclosure, this information may further include characterizations of workloads hosted on the server 114, such as a count of a number of workloads falling into one or more workload clusters. As discussed above, such counts may be maintained for all clusters, or for outlier clusters with resource usage deviating from a threshold ratio of resource usage by a designated amount (e.g., as established by an administrator of the service). This information may be used by the load balancer 112 in implementing the techniques described herein. In some instances, the load balancer 112 may collect this information directly, such as by periodically communicating with each server 114 to gather the information. In other instances, the environment 110 may include additional health checking devices (not shown in FIG. 3) that collect this information and make it available to the load balancer 112.

In accordance with embodiments of the present disclosure, the load balancer 112 can route requests to servers 114 based on an expected resource utilization associated with the request and based on current workloads assigned to the servers 114. More particularly, the load balancer 112 may determine a shape of the expected resource utilization (the load) and place the request on a server 114 with other loads that are de-correlated or anti-correlated with the expected resource utilization. For example, the load balancer 112 may identify a sample of n servers (e.g., at random) and score these servers according to correlated or anti-correlated workloads, such as by decreasing a score for each correlated workload already placed on the server 114 and increasing a score for each anti-correlated workload already placed on the server 114. The load balancer 112 may then place the request on a highest scoring server 114 among the n servers, or may apply additional selection criteria to place the request among the highest scoring k servers. As discussed above, the number of correlated or anti-correlated workloads can illustratively be characterized based on clusters in which the workloads fall. Thus, a load balancer 112 in one embodiment identifies a pre-determined cluster to which the workload of an incoming request belongs, and then scores the n servers based on current cluster counts on the servers. Because this analysis relies on state information as to a limited number of clusters among a limited number of servers, the analysis can be completed quickly and routing decision on the load balancer 112 can occur with minimal latency, while still achieving high efficiency placement.

While a single load balancer is shown in FIG. 3, embodiments of the present disclosure may include multiple load balancers 112 that themselves act as a distributed service. Each load balancer 112 can implement the techniques described herein in order to gain the advantages of these techniques. In some instances, these techniques may be implemented with little or no synchronization of information or coordination between load balancers 112, other than implementing the same techniques. For example, each load balancer 112 may obtain state information for servers 114 from a centralized location (e.g., a health monitoring service for the servers 114), and make routing decisions based on that state information, without requiring communications between balancers 112 when making such decisions.

While FIG. 3 depicts a simplified environment 110, environments in practice may contain more or different components than shown in FIG. 3. For example, an environment in practice may include one or more "frontends" that directly obtain request from client devices 102, and that pass such request to the load balancer 112 when necessary (e.g., where a server 114 is not already assigned to handle the request). Thus, the configuration of FIG. 3 is illustrative in nature.

As will be appreciated by one of skill in the art in light of the present disclosure, the embodiments disclosed herein improves the ability of computing systems, such as cloud computing environments, to efficiently allocate computing resources, enabling load to be distributed among different devices to shape the load according to the resources of those devices and thus minimize inefficiency in use of those resources. Moreover, the presently disclosed embodiments address technical problems inherent within computing systems; specifically, the limited nature of computing resources in handling various loads, the variety of workloads handled by computing systems, and the inherent complexities in allocating resources among those different configurations. These technical problems are addressed by the various technical solutions described herein, including the use of a load balancer that routes requests according to the shape of expected resource usage of a workload requested and correlation or anti-correlation of that shape with other workloads handled by potential destination devices. Thus, the present disclosure represents an improvement in cloud computing environments and computing systems in general.

Figure 4:
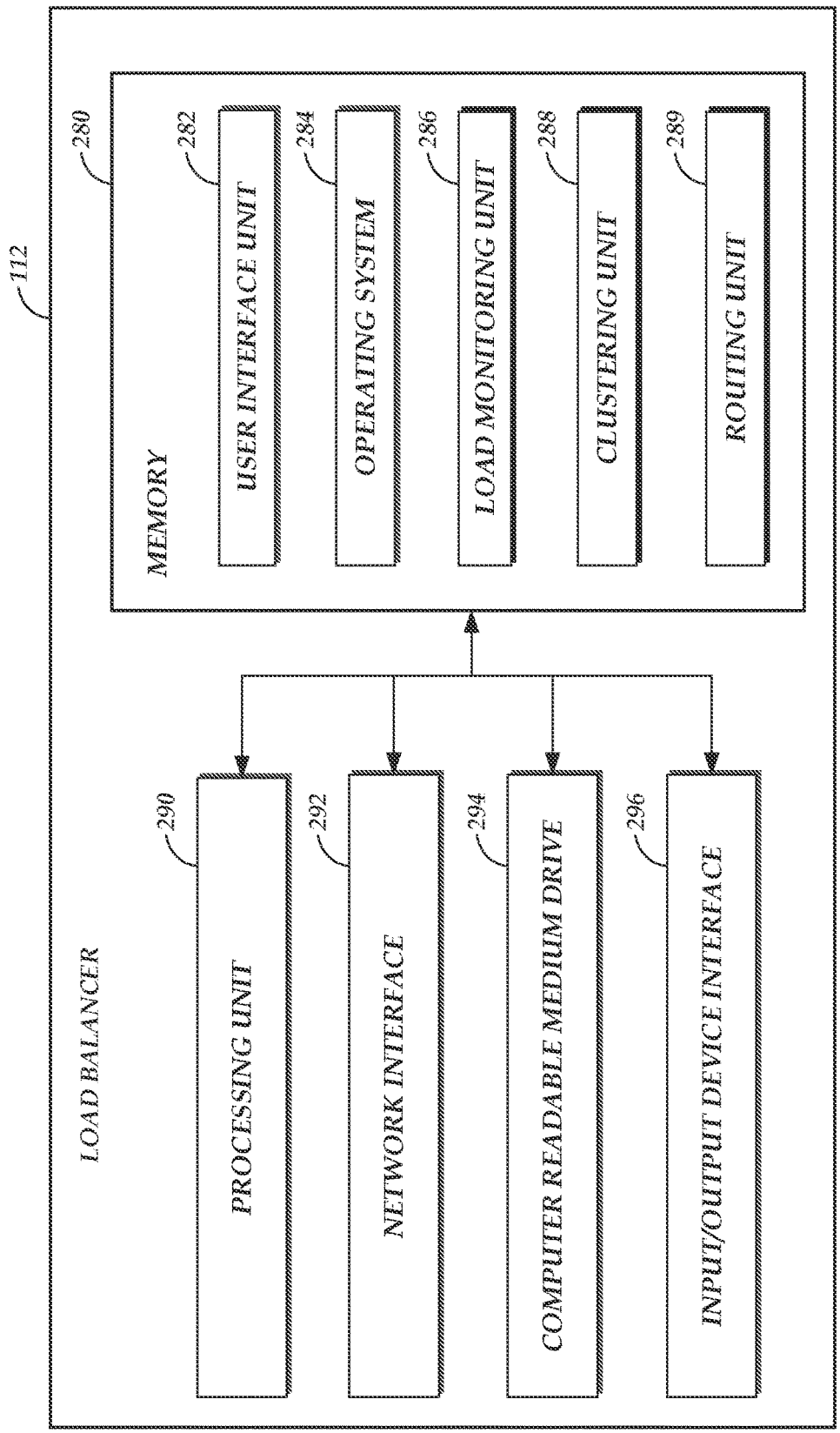
FIG. 4 depicts a general architecture of a computing device providing a load balancer that is configured to route workloads among the set of servers of FIG. 3.

FIG. 4 depicts a general architecture of a computing system (referenced as load balancer 112) that operates to facilitate load balancing of requests between servers of a fleet in accordance with embodiments of the present disclosure. The general architecture of the load balancer 112 depicted in FIG. 4 includes an arrangement of computer hardware and software modules that may be used to implement aspects of the present disclosure. The hardware modules may be implemented with physical electronic devices, as discussed in greater detail below. The load balancer 112 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 3. As illustrated, the load balancer 112 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the balancer 112. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device, and an operating system 284. In addition, the memory 280 may include and/or communicate with one or more data repositories (not shown), for example, to access user program codes and/or libraries.

In addition to and/or in combination with the user interface unit 282 and operating system 284, the memory 280 may include a load monitoring unit 286, clustering unit 288, and routing unit 289 that may be executed by the processing unit 290. In one embodiment, the load monitoring unit 286, clustering unit 288, and routing unit 289 implement various aspects of the present disclosure. For example, the load monitoring unit 286 can represent code executable to obtain load information for servers 114 within a fleet, such as historical resource usage of workloads and/or a count of workloads hosted in each of a set of clusters (e.g., all clusters). The clustering unit 288 may represent code executable to utilize the historical resource usage of workloads to cluster workloads into clusters. The routing unit 289 can represent code executable to route an individual request according to correlations or anti-correlations of between the workload of the request and workloads on the servers 114.

Figure 5:
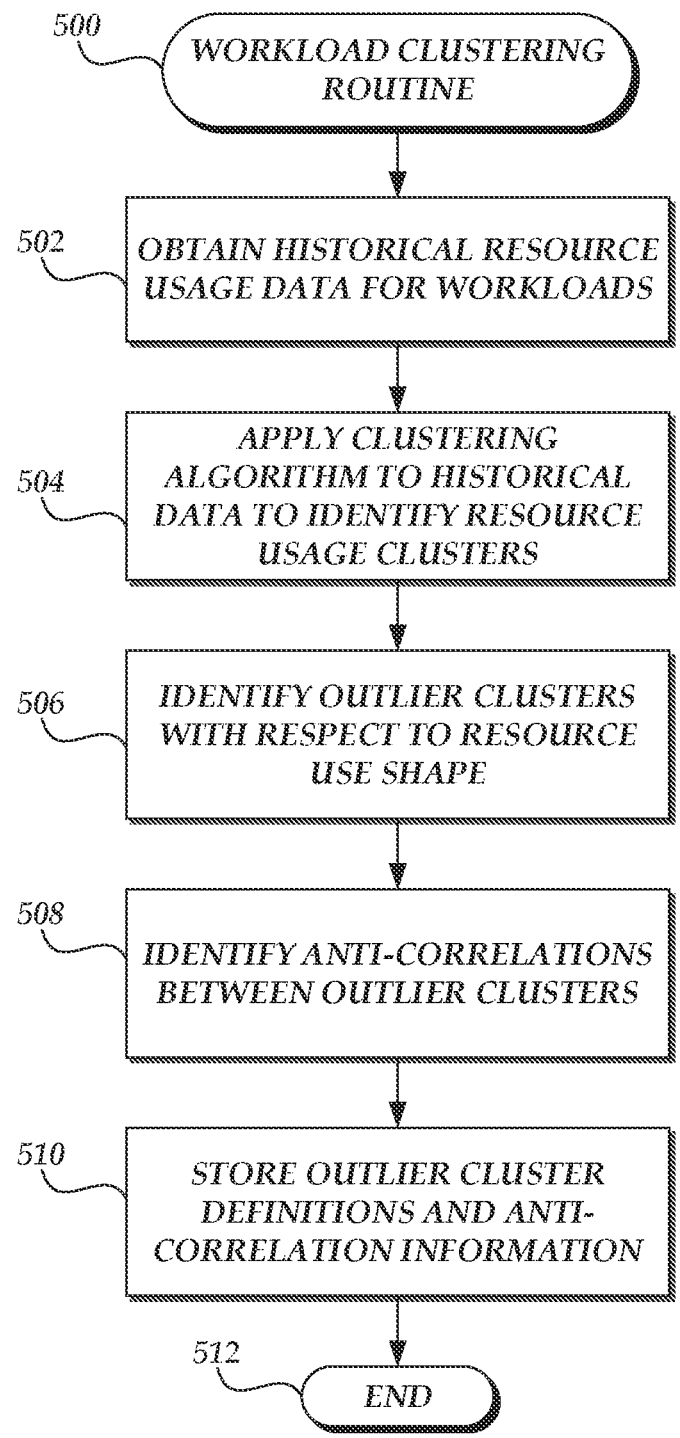
FIG. 5 is a flow chart depicting an illustrative routine for clustering workloads in order to determine correlations and anti-correlations among workloads in accordance with embodiments of the present disclosure.
Figure 6:
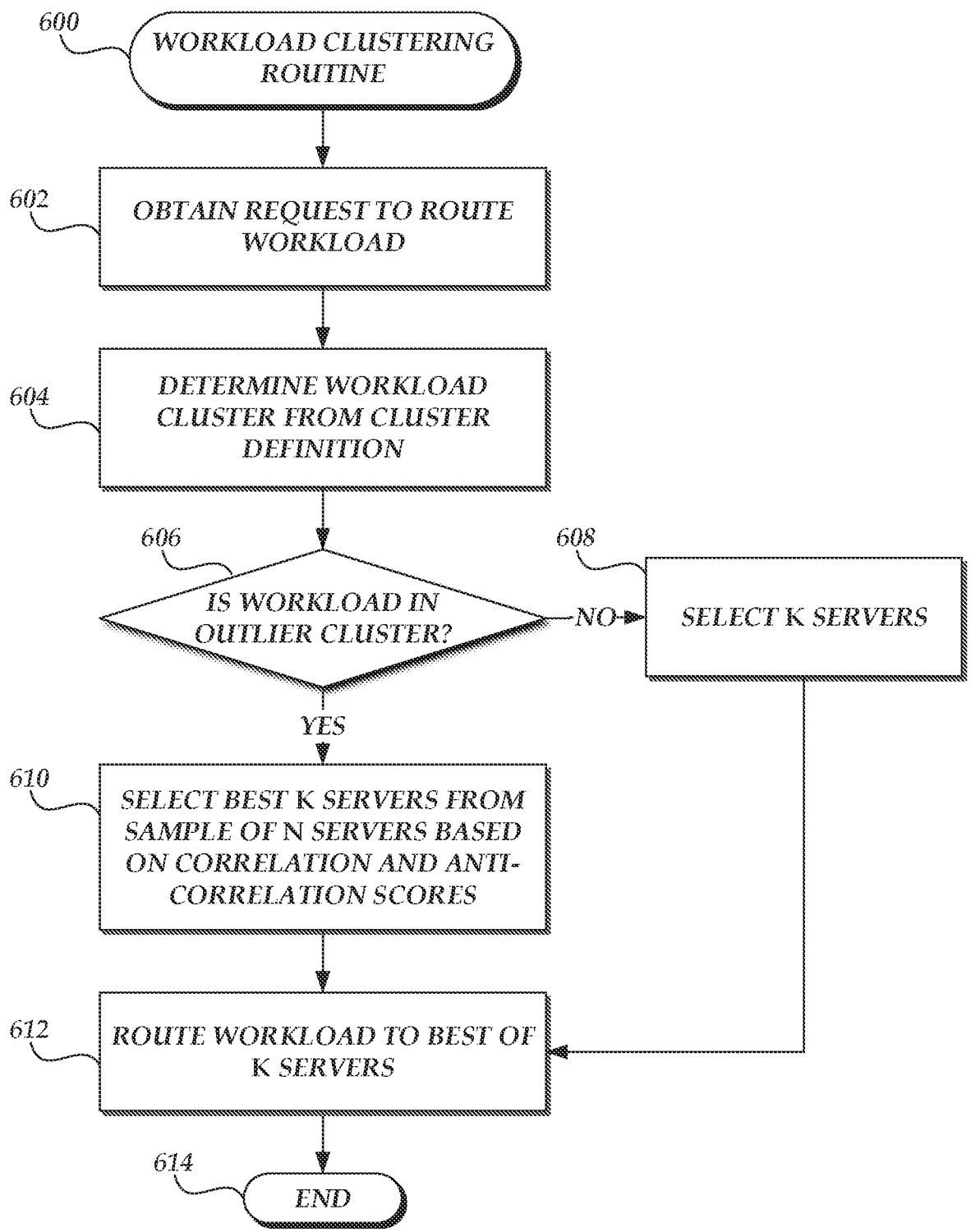
FIG. 6 is a flow chart depicting an illustrative routine for routing workloads according to correlations or anti-correlations of the workloads and other workloads on potential servers.

With reference to FIGS. 5 and 6, illustrative routines will be described that may be implemented by a load balancer 112 to implement embodiments of the present disclosure. Specifically, FIG. 5 depicts a routine 500 for determining clusters of workloads according to historical resource usage of the workloads, while FIG. 6 depicts a routine 600 for routing a request to initialize a workload based on its associated cluster and correlations or anti-correlations with that cluster on potential target servers 114. Illustratively, the routine 500 may be conducted as an "offline" process, asynchronously to handling client requests to initiate a workload. The offline process may be implemented, for example, at periodic intervals (e.g., each eek). By handling the routine 500 as an offline process, the amount of information processed during routine 500 can be increased, as latency constraints are greatly relaxed. Thereafter, the routine 600 may be implemented synchronously to call handling, in order to route requests ("calls") to initiate a workload and enable such routing to occur in a low latency fashion (e.g., on the order of singles or tens of milliseconds or less). While the routines of FIGS. 5 and 6 are described as implemented on load balancer 112, these routines may additionally or alternatively be implemented on other devices. For example, the routine 500 of FIG. 5 may be implemented by a server 114, with results of the routine 500 (e.g., cluster definitions and anti-correlation information) provided to a load balancer 112 thereafter.

The routine 500 begins at block 502, where the load balancer 112 obtains historical resource usage data for workloads. The workloads may be any repeated process initiated on servers 114. For example, where servers 114 form a serverless computing system, each workload may be a "function" on the serverless computing system, corresponding to code that is executed by the serverless computing system in response to a call to invoke that function. The historical resource usage data may be any statistical measurement of resource usage of a workload, including average usage, median usage, probability thresholds (e.g., x % of instances of this workload use less than this amount), etc. In one embodiment, the balancer 112 obtains historical usage information for all known workloads of the servers 114. In another embodiment, the load balancer 112 obtains historical usage information for a subset of known workloads, such as workloads invoked during a past time period (e.g., the past week, past day, period since last implementation of the routine 500, etc.).

At block 504, the load balancer 112 applies a clustering algorithm to the historical usage data to identify resource usage clusters. The clustering algorithm may be, for example, the k-means algorithm that is known in the art. As discussed above, the algorithm illustratively maps the historical resource usage of workloads into an n-dimensional space, and groups the workloads according to distances within that space. Accordingly, similar workloads are grouped together into workload clusters that can be used to characterize those workloads.

Thereafter, at block 506, the load balancer 112 identifies cluster outliers. Each outlier may represent a cluster whose characteristic resource usage differs from a baseline level by a threshold amount. In one embodiment, the characteristic resource usage and baseline level are described as an n-dimensional shape of resource usage (e.g., m CPU usage by n CPU usage), with each dimension of that shape representing one or more resource types. The shape of resource usage may also be referred to as a vector. The baseline level may be set, for example, as a proportion of resources provided by a physical configuration of the servers, or as a statistical measure of workloads (e.g., as an average of all workloads). The threshold may be set as an absolute value (e.g., as a Euclidean distance/within the n-dimensional space) or as a relative value (e.g., a Euclidean distance at least n standard deviations from the baseline level). Each cluster may be analyzed, for example, based on a distance between a centroid of the cluster and the baseline level.

At block 508, the load balancer 112 identifies anti-correlations between clusters. An anti-correlation generally corresponds to two clusters that have an inverse distance from the baseline level, such as one cluster having a centroid a x distance from the baseline level and another having a centroid at negative x distance. In some instances, the directionality of a centroids cluster may be used to determine anticorrelations. For example, anti-correlation may be based on a summation of the distance vectors for two clusters (e.g., distance between the respective centroids and the baseline level) being less than the two distance vectors individually. In some embodiments, anti-correlation may be weight. For example, one cluster may be said to be x % anti-correlated with another cluster. The weighting may be based, for example, on a reduction in distance to the baseline level when vectors of the two clusters are summed (e.g., such that a 90% reduction in distance indicates a 90% anti-correlation). In some embodiments, the distance used may be Euclidian distance. In other embodiments, non-Euclidian distances may be used. For example, while Euclidian distance is given by the mathematical 2-norm (or Euclidian norm) other norms may be used, a variety of which are known in the art. For example, a 1-norm function may be used to assess distance. Other distance functions, such as cosine similarity, Pearson's coefficient, or cross-correlation may be used. A variety of such distance functions are known in the art. As discussed below, weighted anti-correlations may in some cases be used to weight scoring among candidate servers.

At block 510, the load balancer 112 stores the outlier cluster definitions and anti-correlation information. For example, the balancer 112 may store information identifying the workloads existing in each outlier cluster, or may store ranges of resource usage falling within each outlier cluster. Accordingly, the balancer 112 can later determine whether a particular requested workload falls within an outlier cluster. The anti-correlation information may be stored, for example, as cluster pair information, indicating whether a particular pair of clusters are anti-correlated and potentially to what amount they are anti-correlated. As discussed below, the stored information can then be used to quickly route requests to invoke workloads to an appropriate destination.

While routine 500 is described with respect to outlier clusters, in some embodiments a load balancer 112 may route requests based on identification of all potential clusters. Accordingly, the routine 500 may be modified to store information on all clusters, rather than only outlier clusters.

One illustrative routine 600 for routing a request to initialize a workload based on its associated cluster and correlations or anti-correlations with that cluster on potential target servers 114 is shown in FIG. 6. As discussed above, the routine 600 is illustratively carried out by a load balancer 112.

The routine 600 begins at block 602, where the load balancer 112 obtains a request to route a workload. The request may be, for example, a request to invoke code, such as a serverless function, on a target server 114. At block 604, the load balancer 112 determines a cluster for the requested workload from cluster definitions generated, e.g., via routine 500. For example, the load balancer 112 may determine whether the workload is identified within a definition as belonging to a given cluster. Alternatively, the load balancer 112 may obtain a historical resource usage metrics for the workload (e.g., average usage) and compare the metrics to ranges of usage defined for each cluster to determine whether the workload falls within a given cluster. In some embodiments, the load balancer 112 implements block 604 only with respect to outlier clusters. This may speed implementation of block 604, since it might be expected that a large majority of workloads do not belong to outlier clusters, and thus the comparisons required to determine whether a workload belongs to an outlier cluster may be minimal.

The routine 600 then varies according to whether the workload is determined at block 606 to belong to an outlier cluster. If so, the routine 600 proceeds to block 610, where the load balancer 112 applies correlation and anti-correlation information to place the requested workload on a server with other workloads that are de-correlated or anti-correlated to the workloads already placed on that server. Specifically, at block 610, the load balancer 112 selects (e.g., at random) a sample set of n servers 114 from the servers 114 available to handle the workload. The load balancer 112 then selects a best k servers 114 from the sample set, according to correlation and anti-correlation information. Illustratively, the balancer 112 may score each server 114 within the sample set, with a score decreasing for each current workload on the server 114 that is correlated to the present workload (e.g., within the same cluster as the present workload) and increasing for each current workload on the server 114 that is anti-correlated to the present workload (e.g., within a cluster anti-correlated to the cluster of the present workload). In some embodiments, the load balancer 112 may score based on a combination of correlation and anti-correlation information. In other embodiments, the balancer 112 may score based on one of correlation or anti-correlation. As discussed above, in some instances scoring based on anti-correlation may be weighted based on a degree of anti-correlation. For example, a score may increase by one (or other fixed value) for each workload on a server 114 within a cluster perfectly anti-correlated to a cluster of a current workload, or x % of one for each workload on a server 114 that is within a cluster x % anti-correlated to that workload. Illustratively, each server 114 may be configured to maintain as state information a count of workloads within each cluster currently placed on the server, and the load balancer 112 may request this information in connection with analyzing placements during block 610. In other embodiments, each server 114 may periodically report such information to the load balancer 112 or other location, and the load balancer 112 may reference this information during block 610. In some instances, the state information may be reported only for workloads within an outlier cluster, significantly limiting the amount of state information reported by each server 114.

While correlation scores are described above with respect to other workloads that share a cluster with a workload being placed, other correlation scores are possible. For example, in some embodiments workloads may be clustered using a hierarchical clustering algorithm, such that clusters exist within a hierarchy. A correlation score may thus be determined based not only on present workloads sharing a cluster with a to-be-placed workload, but on present workloads related in a cluster hierarchy to a the to-be-placed workload. For example, a score may be decreased by a given amount (e.g., one) for each present workload sharing a cluster with the to-be-placed workload, and decreased by a lesser amount for each present workload in a different, but hierarchically related, cluster than the to-be-placed workload. The lesser amount may be based, for example, on a distance between the cluster of the present workload and the cluster of the to-be-placed workload. Illustratively, where workloads are organized within a hierarchical tree structure, the distance may be based on a closest "common ancestor" in the tree, such that clusters that are "siblings" (e.g., having a common parent node in the tree) are considered closer within the tree than clusters that are "first cousins" (e.g., having a common grandparent node). In one embodiment, distance between clusters acts as a decay function for the amount of score reduction otherwise applied to workloads in the same cluster as the to-be-placed workload. For example, sibling clusters may result in a 10% decay, first cousins may result in a 20% decay, and so on.

After scoring the sample set of servers, the load balancer 112, at block 610, selects a best k servers according to the calculated scores. The values of n and k may be set according to the requirements and capabilities of the load balancer 112. For example, higher values of n and k may result in more efficient placement, but increased latency and resource consumption at the balancer 112. Conversely, lower values may result in more rapid and less costly operation, but decreased placement accuracy. In one embodiment, n is set as a multiple of k. For example, k is set to 3 and n is set to 2 times k (6). Other values are possible according to the specific configuration of the servers 114 and load balancer 112.

Returning to block 606, in the instance that the requested workload does not fall within an outlier cluster, the routine 600 proceeds to block 608, where the load balancer 112 selects k servers, without consideration of correlation or anti-correlation information. Use of such correlation or anti-correlation information only in cases of outlier functions can result in minimal additional latency being incurred for routing of most functions. The particular mechanism for selecting k servers may be any number of mechanisms for placement selection known in the art. For example, the k servers may be selected at random from among all healthy servers 114.

In either instance, subsequent to block 608 or 610, the routine 600 proceeds to block 612, where the load balancer 112 selects a "best" server from the k servers. The best server may be selected according to any number of criteria applied to the k servers. Preferably, the selection criteria enables rapid selection with minimal required state information stored regarding servers 114. For example, the selection criteria may be a least loaded server 114 in terms of total present memory (e.g., RAM) usage. Thus, the load balancer 112 can then route the request to the selected server. The routine 600 then ends at block 614.

One skilled in the art will appreciate that the routine 600 may be varied in a number of ways. For example, blocks 610 and 612 may be applied to all workloads, without regard to whether a workload falls within an outlier cluster. This is illustratively equivalent to setting the threshold for a cluster being an outlier at a very low level. As another example, scoring applied at block 610 may be used to select a particular server 114 to which to route the request, obviating a need for block 612. This is illustratively equivalent to setting k to one. Accordingly, while a particular examples are discussed above with respect to FIG. 6, in practice the routine 600 may be modified according to the particular servers 114 and load balancers 112 in order to provide efficient, low latency routing of workloads.

Moreover, the routine 600 may in some embodiments be modified or combined with other functionalities. Illustratively, where a fleet or servers 114 contains more than a single configuration of computing resources (e.g., each representing a sub-fleet), a sub-fleet routing routine may be implemented prior to the routine 600, which routine selects an appropriate sub-fleet to which to route a workload. An example sub-fleet routing routine is disclosed in U.S. patent application Ser. No. 17/208,979, entitled "ALLOCATING WORKLOADS TO HETEROGENOUS WORKER FLEETS" and filed concurrently with the present application, the entirety of which is hereby incorporated by reference. For example, a request routing device as disclosed in the '_1_Application may be implemented prior to a load balancer 112 of the present disclosure. As another example, operation of the load balancer 112 can be further improved by implementation of routine to bias selection of servers according to age. An example of such a routine is disclosed in U.S. patent application ser. No. 17/209,008, entitled "ALLOCATION OF WORKLOADS IN DYNAMIC WORKER FLEET" and filed concurrently with the present application, the entirety of which is hereby incorporated by reference. For example, a load balancer 112 may implement a combined routine combining routine 600 with the routine 500 of the '_3_Application, such as by modifying blocks 608 and 610 of the routine 600 such that selection occurs according to a biased probability distribution, as disclosed the '_3_Application. Thus, the routine 600 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a set of server computing devices configured to implement workloads on behalf of client computing devices; and
   a processor that implements one or more load balancer devices configured to:
      obtain historical resource usage data for the workloads, the historical resource usage data indicating for each given workload at least a proportion of a first computing resource consumed by the given workload relative to a second computing resource; and
      cluster the workloads into a plurality of workload clusters, each workload cluster including at least one workload of the workloads, wherein each workload cluster contains workloads identified as similar with respect to the proportion of the first computing resource, consumed by the workloads within the given workload cluster, relative to the second computing resource, wherein at least some clusters of the plurality of workload clusters are anti-correlated with other clusters of the plurality of workload clusters, and wherein anti-correlation between two clusters indicates that proportions of the two clusters with respect to consumption of the first and second computing resources are at least partly inverse to one another;
   wherein the one or more load balancer devices are further configured to route a request to initiate a first workload at least by:
      determining a first workload cluster, from the plurality of workload clusters, that includes the first workload;
      scoring server computing devices within the set of server computing devices based at least partly on a number of other workloads on each server computing device that fall within the first workload cluster that contains workloads identified as similar with respect to the proportion of the first computing resource, consumed by the workloads within the first workload cluster, relative to the second computing resource and on a number of other workloads on each server computing device that fall within a cluster that is anti-correlated with the first workload cluster, wherein server computing devices with workloads that fall within the first workload cluster that contains workloads identified as similar are scored to make routing less likely and server computing devices with workloads that fall within a cluster that is anti-correlated with the first workload cluster are scored to make routing more likely;
      routing the first workload to a first server computing device selected from the set of server computing devices according to a score of the first server computing device as scored based at least partly on a number of other workloads on each server computing device that fall within the first workload cluster that contains workloads identified as similar with respect to the proportion of the first computing resource, consumed by the workloads within the first workload cluster, relative to the second computing resource, wherein the first server computing device is scored to make routing more likely, and
   wherein the first server computing device, of the set of server computing devices, executes the first workload.

2. The system of claim 1, wherein the set of server computing devices are associated with a serverless computing system, and wherein the first workload is execution of code on the serverless computing system.

3. The system of claim 1, wherein each of the first and second computing resources correspond to at least one of processor time, memory, or bandwidth.

4. The system of claim 1, wherein the processor that implements the one or more load balancer devices is configured to cluster the workloads asynchronously to routing requests to initiate workloads.

5. A computer-implemented method comprising:
   obtaining historical resource usage data for workloads implemented by a computing system including a plurality of servers, the historical resource usage data indicating for each given workload at least a proportion of a first computing resource consumed by the given workload relative to a second computing resource;
   clustering the workloads into a plurality of workload clusters, each workload cluster including at least one workload of the workloads, wherein each given workload cluster contains workloads identified as similar with respect to the proportion of the first computing resource, consumed by the workloads within the given workload cluster, relative to the second computing resource;

obtaining a request to initiate a first workload on the computing system;

determining a first workload cluster, from the plurality of workload clusters, that includes the first workload;

scoring servers within the plurality of servers based at least partly on a number of other workloads on each server that fall within the first workload cluster that contains workloads identified as similar with respect to the proportion of the first computing resource, consumed by the workloads within the first workload cluster, relative to the second computing resource and on a number of other workloads on each server that fall within a cluster that is anti-correlated with the first workload cluster, wherein servers with workloads that fall within the first workload cluster that contains workloads identified as similar are scored to make routing less likely and servers with workloads that fall within a cluster that is anti-correlated with the first workload cluster are scored to make routing more likely;

routing the first workload to a server selected from the plurality of servers based on a score of the server as scored based at least partly on a number of other workloads on each server that fall within the first workload cluster that contains workloads identified as similar with respect to the proportion of the first computing resource, consumed by the workloads within the first workload cluster, relative to the second computing resource and on a number of other workloads on each server that fall within a cluster that is anti-correlated with the first workload cluster, wherein the server, of the plurality of servers, executes the first workload.

6. The computer-implemented method of claim 5, where scoring the servers based at least partly on the number of other workloads on each server computing device that fall within the first workload cluster comprises obtaining, from each server, a count of other workloads on the server that fall within the first workload cluster.

7. The computer-implemented method of claim 5, wherein determining the first workload cluster that includes the first workload comprises at least one of determining that a cluster definition for the first workload cluster identifies the first workload or that a statistical measurement of historical resource usage by the first workload falls within a range of historical resource usages that is associated with the first workload cluster.

8. The computer-implemented method of claim 5 further comprising:

identifying, from the plurality of workload clusters, a subset of outlier clusters, wherein each outlier cluster represents a set of workloads in which the proportion of the first computing resource consumed by the set of workloads relative to the second computing resource differs from a baseline proportion by a threshold amount;

wherein determining the first workload cluster that includes the first workload further comprises determining that the first workload cluster is within the subset of outlier clusters.

9. The computer-implemented method of claim 8, wherein the baseline proportion is set based at least partly on one or more of an average proportion of the first computing resource consumed by the workloads relative to the second computing resource or a proportion of the first computing resource relative to the second computing resource provided by a hardware configuration of the plurality of servers.

10. The computer-implemented method of claim 8, wherein clustering the workloads into a plurality of workload clusters identifies a distance of each workload cluster from the baseline proportion within n-dimensional space, wherein each dimension within the n-dimensional space corresponds to one or more types of computing resource, and wherein the threshold amount is set as at least an absolute distance within the n-dimensional space or a number of standard deviations of the absolute distance.

11. The computer-implemented method of claim 5, wherein the plurality of servers are selected at random from among a broader set of servers of the computing system.

12. The computer-implemented method of claim 5, wherein routing the first workload to the server selected from the plurality of servers according to the score of the server comprises:

selecting k servers from the plurality of servers according to scores of each of the k servers, where k is greater than one; and selecting the server from the k servers according to a current availability of computing resources on the server.

13. The computer-implemented method of claim 5, wherein a number, n, of servers within the plurality of servers is selected as a multiple of k.

14. The computer-implemented method of claim 5, wherein at least some clusters of the plurality of workload clusters are anti-correlated with other clusters of the plurality of workload clusters, and wherein anti-correlation between two clusters indicates that proportions of the two clusters with respect to consumption of the first and second computing resources are at least partly inverse to one another, and wherein scoring the servers within the plurality of servers is further based at least partly on a number of other workloads on each server that fall within a cluster that is anti-correlated with the first workload cluster.

15. One or more non-transitory computer-readable media comprising computer executable instructions that, when executed by a computing system including a plurality of servers, cause the computing system to:

obtain historical resource usage data for workloads implemented on the computing system, the historical resource usage data indicating for each given workload at least a proportion of a first computing resource consumed by the given workload relative to a second computing resource;

cluster the workloads into a plurality of workload clusters, each workload cluster including at least one workload of the workloads, wherein each workload cluster contains workloads identified as similar with respect to the proportion of the first computing resource, consumed by the workloads within the given workload cluster, relative to the second computing resource;

obtain a request to initiate a first workload on the computing system;

determine a first workload cluster, from the plurality of workload clusters, that includes the first workload;

route the first workload to a server selected from the plurality of servers according to at least a number of other workloads on the server that fall within the first workload cluster that contains workloads identified as similar with respect to the proportion of the first computing resource, consumed by the workloads within the first workload cluster, relative to the second computing resource and on a number of other workloads on each server that fall within a cluster that is anti-correlated with the first workload cluster, wherein servers with workloads that fall within the first workload cluster that contains workloads identified as similar are scored to make routing less likely and servers with workloads that fall within a cluster that is anti-correlated with the first workload cluster are scored to make routing more likely, wherein the server, of the plurality of servers, executes the first workload.

16. The one or more non-transitory computer-readable media of claim 15, wherein each workload cluster contains workloads identified as similar with respect to relative proportions among at least three computing resources.

17. The one or more non-transitory computer-readable media of claim 15, wherein at least some clusters of the plurality of workload clusters are anti-correlated with other clusters of the plurality of workload clusters, and wherein anti-correlation between two clusters indicates that proportions of the two clusters with respect to consumption of the first and second computing resources are at least partly inverse to one another, and wherein scoring the servers within the plurality of servers is further based at least partly on a number of other workloads on each server that fall within a cluster that is anti-correlated with the first workload cluster.

18. The one or more non-transitory computer-readable media of claim 17, wherein scoring the servers within the plurality of servers is further based at least partly with the first workload cluster.

19. The one or more non-transitory computer-readable media of claim 17, wherein to route the first workload to the server selected from the plurality of servers according to the score of the server, the computer executable instructions cause the computing system to:

select k servers from the plurality of servers according to scores of each of the k servers, where k is greater than one; and select the server from the k servers according to a current availability of computing resources on the server.

20. The one or more non-transitory computer-readable media of claim 19, wherein the plurality of servers are selected at random from among a larger set of servers of the computing system.

\* \* \* \* \*